United States Patent [19]

Sato

[11] 4,215,735
[45] Aug. 5, 1980

[54] SAFETY PNEUMATIC TIRES

[75] Inventor: Takeshi Sato, Akigawa, Japan

[73] Assignee: Bridgestone Tire Company Limited, Kyobashi, Japan

[21] Appl. No.: 883,082

[22] Filed: Mar. 2, 1978

[30] Foreign Application Priority Data

Apr. 8, 1977 [JP] Japan ................... 52-39561

[51] Int. Cl.² .............................................. B60C 9/00
[52] U.S. Cl. ...................... 152/354 R; 152/330 RF; 152/361 DM
[58] Field of Search ........ 152/354 R, 357 R, 330 RF, 152/361 R, 362 R, 353 R, 352 A

[56] References Cited

U.S. PATENT DOCUMENTS

| | | | |
|---|---|---|---|
| 1,032,544 | 7/1912 | Hess et al. | 152/362 R X |
| 1,987,350 | 1/1935 | Reel | 152/354 |
| 2,953,183 | 9/1960 | Frohlich et al. | 152/354 |
| 2,976,905 | 3/1961 | Beckadolph | 152/361 R X |
| 3,245,454 | 4/1966 | Lewis | 152/354 R |
| 3,904,463 | 9/1975 | Boileau | 152/354 R X |
| 3,911,987 | 10/1975 | Takusagawa et al. | 152/354 R |
| 3,964,533 | 6/1976 | Arimura et al. | 152/354 |
| 3,994,329 | 11/1976 | Masson et al. | 152/354 R |
| 3,999,585 | 12/1976 | Grawey | 152/361 R |
| 4,077,454 | 3/1978 | Miyoshi et al. | 152/354 R |
| 4,120,338 | 10/1978 | Mirtain | 152/354 R |
| 4,142,568 | 3/1979 | Kleijwegt | 152/354 R |

FOREIGN PATENT DOCUMENTS 2425068  4/1975  Fed. Rep. of Germany .... 152/330 RF

Primary Examiner—John J. Love
Assistant Examiner—D. W. Underwood
Attorney, Agent, or Firm—Sughrue, Rothwell, Mion, Zinn and Macpeak

[57] ABSTRACT

A safety pneumatic tire which can run under its punctured condition.

The tire is provided between a sidewall reinforcing layer and a tread wall reinforcing layer with a reduced thickness portion which can easily susceptible to bending deformation so as to notify a driver by his bodily sensation that the tire is punctured.

7 Claims, 1 Drawing Figure

SAFETY PNEUMATIC TIRES

BACKGROUND OF THE INVENTION

1. Field of the Invention

This invention relates to pneumatic tires and more particularly to a safety pneumatic tire for motorcycles which is often used with its rotary shaft inclined at a relatively large angle with respect to the road surface and which can run under its punctured condition.

2. Description of the Prior Art

In recent years paved roads and highways are becoming completed and running performance of vehicles are becoming ever improved. As a result, the vehicles tend to run at a high speed and hence a more effective driver protection means is now urgently in demand.

Recently, tires are not often punctured by penetrations of obstacles such as a nail therethrough because of paved roads. Existing traffic congestion and high speeds of vehicles have become remarkable beyond comparison with the past. Under such circumstances, if tires while running become punctured and vehicles could not run further, the drive is inconvenienced. Particularly, if a tire for motorcycles (hereinafter is called as two-wheeled vehicles,) in high speed running becomes punctured, there is the danger of the motorcycle falling down.

Various types of pneumatic tires comprising an inner tire or means for enabling the tire to run in a safety state even after the puncture of tire have heretofore been proposed. Among these tires, a so-called sidewall reinforcing type tire comprising a hard rubber layer extending from the sidewall of the tire to the tread and supporting the load subjected to the tire by inherent rigidity of the sidewall when it is punctured is particularly usefull as a tire for two-wheeled vehicles.

Such type of tire has a high load supporting ability, but when a rear wheel of the two-wheeled vehicle becomes punctured, if the wheels are inclined to the road surface of the purpose of cornering, that is, if the equational plane of the tire is inclined at an angle with respect to a perpendicular plane to the road (hereinafter called camber angle) and if the camber angle exceeds a given angle, the centrifugal force acting in a direction in parallel with the road surface causes the tire to suddenly bend. As a result, the rear wheel slips in a direction opposite to the cornering direction and hence the front portion of the vehicle tends to turn toward the cornering direction by an extent exceeding that aimed at by the driver, thereby involving an excessively large oversteering. Average drivers could not deal with such phenomenon and hence there is a risk of the vehicle falling and the drivers injured.

This problem is much worth consideration since the driver could not be aware of the abnormal state of the tire due to its puncture when the above mentioned tire having a high load supporting ability is running straight ahead on road.

SUMMARY OF THE INVENTION

An object of the invention, therefore, is to provide a safety pneumatic tire which is the same in abilities as usual tires when the tire runs under its normal condition, which can permit drivers to note the abnormal condition of the tire when the tire is punctured and which can smoothly produce a camber thrust corresponding to reaction force produced when the tire is inclined to set a camber angle.

A feature of the invention is the provision of a safety pneumatic tire comprising a toroidal-shaped carcass extending between a pair of left and right bead portions. A tread has a wide width and extending along a crown portion of said carcass, with sidewalls connecting said tread to each of said bead portions. A sidewall reinforcing layer is mainly composed of rubber or rubber-like elastic material which is meniscus-shaped in section and disposed along said carcass, said sidewall reinforcing layer having a thickness required for supporting that load which is subjected to the tire when it is punctured and made integral with said bead portion. At least one tread reinforcing layer is composed of material having a thickness and disposed along said carcass and a relatively narrow zone formed between said sidewall and reinforcing layer and said tread reinforcing layer and easily susceptible to bending deformation.

DESCRIPTION OF THE DRAWING

The invention will now be described in greater detail with reference to the accompanying drawing, wherein.

DETAILED DESCRIPTION OF THE PREFERRED EMBODIMENT

Figure 1:
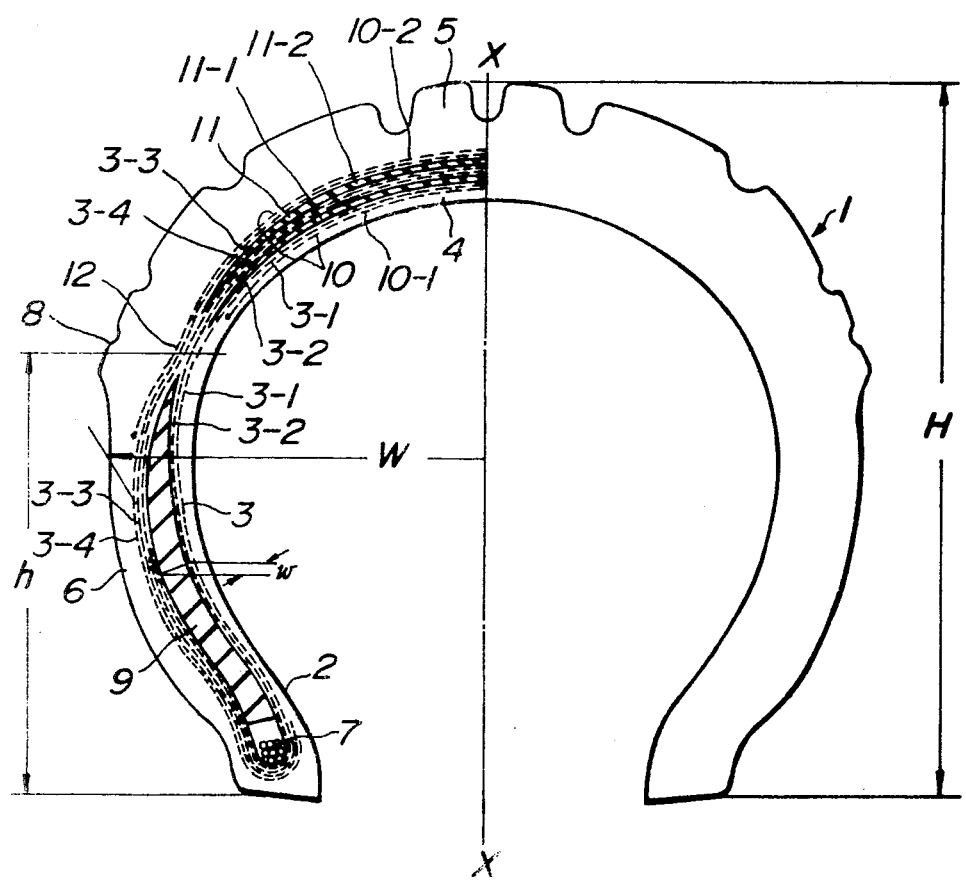
FIG. 1 is a cross-sectional view of one-half of one embodiment of a safety pneumatic tire according to the invention.
Figure 2:
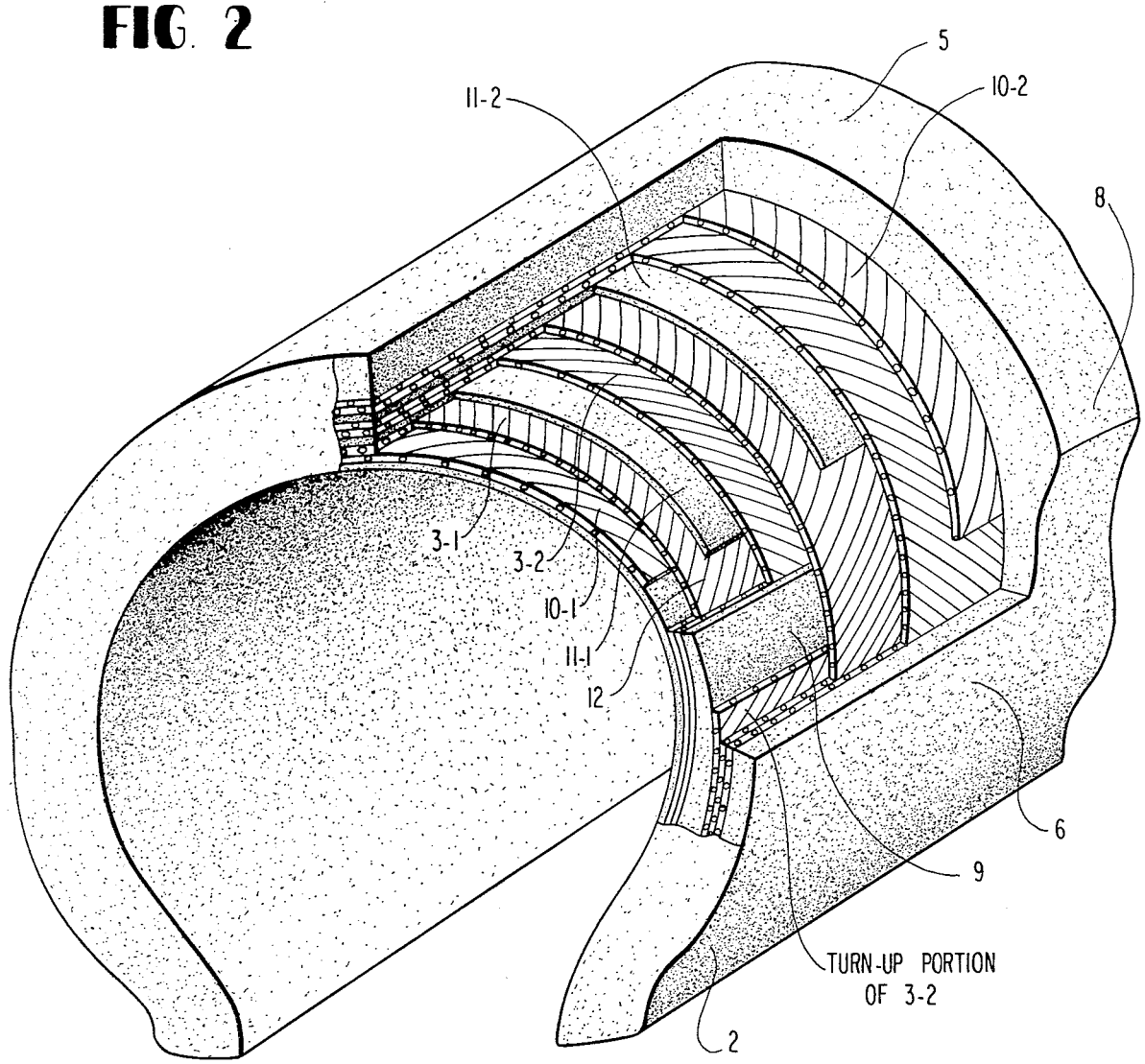
FIG. 2 is a perspective cross-sectional view of one-half of one embodiment of a safety pneumatic tire according to this invention.

Referring to the drawings, reference numeral 1 designates a tire and 2 ilustrates its bead. A carcass 3 is made toroidal in shape and extends in circumferential fashion from the bead 2 to a like bead spaced from and parallel to the bead 2. Around the curved surface of the carcass at a crown portion 4 is superimposed a tread 5 which, in the present embodiment, extends toward the maximum width position of the tire.

In the drawing, a right-half of the equatorial plane x-x on the cross-section of the tire is shown by contours of the tire and its detailed construction is omitted. But, it is a matter of course that the right-half is symmetrical in construction with a left-half shown by cross-section in the drawing.

The cords of the carcass 3 at the crown portion 4 are usually inclined at an angle of 20° to 40° to the equatorial line x-x. In the present embodiment, the carcass 3 is formed of 4 plies superimposed one upon the other, the cords of one of these plies extend in opposite direction to the cords associated with each adjacent ply.

A set of inside plies are composed of two inner plies 3-1 and 3-2 wrapped around a bead wire 7 from the inside toward the outside thereof to form turn-up portions. The turn-up portion of the inner ply 3-1 reaches a center portion of a sidewall 6, while the turn-up portion of the inner ply 3-2 reaches a position located near a shoulder 8. These turn-up portions function to reinforce the bead and sidewall. Whereas, a set of outside plies are composed of two outer plies 3-3 and 3-4 wrapped around the bead wire 7 from the outside toward the inside thereof to form turn-up portions. These turn-up portions terminate at the lower portion of the bead 2.

In the preferred embodiment of the invention shown in the drawing, a sidewall reinforcing layer 9 which is meniscus-shaped in section and formed of rubber or rubber-like elastic material is interposed between the inner ply 3-2 on the one hand and the turn-up portion of the inner ply 3-2, turn-up portion of the inner ply 3-1 and outer ply 3-3 on the other hand. The reinforcing layer 9 is disposed adjacent to the above described inner plies and turn-up portion thereof and outer ply and extends toward the shoulder 8. The reinforcing layer 9 cooperates with the carcass ply 3 and its turn-up portion to reinforce the sidewall. As a result, the reinforcing layer 9 has a thickness which is required for supporting the load subjected to the tire by the rigidity inherent to the sidewall even when the tire becomes punctured to release the inflated air.

The elastic material for the sidewall reinforcing layer 9 has a modulus of elasticity at 100% elongation of 40 to 120 kg/cm$^2$, preferably of 45 to 70 kg/cm$^2$ and suitable thickness selected by the use of the tire from a range such that the maximum thickness is 2 to 8% preferably 3 to 5% of the maximum width of the tire when the tire is united with a given rim and inflated by applying a given internal pressure therein.

In the embodiment shown in the drawing, the reinforcing layer 9 is interposed between the carcass plies. Alternatively, the reinforcing layer 9 may be disposed along the carcass, particularly along the inner surface thereof. Moreover, the reinforcing layer 9 may be divided into a plurality of layers and one of these layers may be interposed between the carcass plies and the other layer may be disposed along the inner surface of the carcass. In addition, the reinforcing layer 9 may be used in combination with a textile cord layer formed of nylon cord, polyester cord, rayon cord etc. or with a metallic cord layer for the purpose of effectively reinforcing the sidewall.

It is preferable to make the cord angle to the textile cord layer larger than the cord angle of the carcass ply with respect to the circumferential direction of the tire and to dispose the textile cord layer on the outside of the reinforcing layer 9, that is, on the axially outside of the tire and to extend the textile cord layer in an opposite direction to the cords of the adjacent carcass ply. In addition, it is more preferable that the textile cord layer has a width which is not shorter than the width of the reinforcing layer 9 and is arranged between the bead 2 and the shoulder 8.

In the present embodiment, the tread 5 is provided with tread reinforcing layers consisting of two cord reinforcing layers 10 and two rubber reinforcing layers 11. Both the reinforcing layers 10, 11 extend in circumferential fashion and also extend from a left side shoulder 8 to a right side shoulder symmetrically with respect to the equatorial line x—x so as to reinforce the tread 5.

The cord reinforcing layers 10-1 is relatively narrow in width and composed of an inside cord layer 10-1 whose end is short of the sidewall reinforcing layer 9 and an outside cord layer 10-2 whose width is so wide that the outside cord layer 10-2 extends over the shoulder 8 and is superimposed about the upper end of the sidewall reinforcing layer 9. The cords of the cord reinforcing layer 10 are inclined at an angle of not smaller than that of the ply cords of the adjacent carcass 3 with respect to the equatorial line x—x, but extend in an opposite direction to the ply cords of the adjacent carcass cords 3. The carcass 3 is interposed between the inside and outside cord layers 10-1 and 10-2.

In the present embodiment, the elastic material mainly constituting the tread reinforcing layer 11 is composed of two rubber sheets 11-1 and 11-2 each of which is relatively thin and equal in thickness in its circumferential direction. The rubber sheet 11-1 is interposed between the two inner carcass plies 3-1 and 3-2, while the rubber sheet 11-2 is interposed between the two outer carcass plies 3-3 and 3-4. These rubber sheets 11-1 and 11-2 extend between the two shoulders 8.

With the tread reinforcing layers it is not always necessary to include the two cord reinforcing layers 10. In accordance with the use of the tire, provision may be made of at least one cord reinforcing layer or at least one rubber reinforcing layer for the purpose of attaining the object of the invention.

The cord of the cord reinforcing layer 10 may be formed of a cord which is the same as the carcass ply cord, textile cord which is different from the carcass ply cord, metal cord etc.

The rubber sheet for constituting the tread reinforcing layer 11 has a modulus of elasticity at 100% elongation of 40kg/cm$^2$ to 120 kg/cm$^2$, preferably 45 kg/cm$^2$ to 70 kg/cm$^2$.

It is preferable to use the rubber sheet having a modulus of elasticity which lies within the above range, but is higher than that of the coating rubber of the carcass ply.

If the internal pressure of the tire is abnormally reduced, the tread is deformed into flat in shape. In this case, the inside cord layer 10-1 of the cord reinforcing layers 10 arranged inside of the tread 5 is subjected to tension. As a result, it is preferable to incline the inside cord layer 10-1 at a cord angle which is larger than that of the outside cord layer 10-2 arranged outside of the tread 5 with respect to the equatorial surface x—x.

As seen from the drawing, the width of each of the rubber sheets 11-1 and 11-2 of the tread reinforcing layer 11 is so determined that the lower end thereof is spaced apart from the upper end of a reduced thickness portion of the sidewall reinforcing layer 9 so as to provide a relatively narrow zone 12 located at the shoulder 8. This zone 12 is not reinforced or reinforced in a relatively small extent if compared with the reinforced sidewall 6 whose rigidity is high and if compared with the main region of the tread 5 and hence constitutes a flexible portion that tends to be easily bent.

In the present embodiment, among various kinds of additional reinforcing layers exclusive of the carcass ply, the outside cord layer 10-2 of the cord reinforcing layer 10 only extends over the zone 12 so as to cover it, so that the zone 12 constitutes a reduced thickness portion whose thickness is considerably thinner than that of the adjacent reinforcing layers as a whole. Alternatively, it is possible to make the thickness of the zone 12 substantially the same as those of the two adjacent regions and arrange in the zone 12, for example, rubber having a small modulus of elasticity to attain the object of the invention in substantially the same manner.

Experimental tests have yielded the result that, in the case of providing the reduced thickness portion to improve its bending property, the object can be attained if the minimum thickness of the reduced thickness portion 12 lies within a range between 40% and 90%, preferably between 50% and 80% of the maximum thickness of the carcass 3 inclusive of the tread reinforcing layer exclusive of a tread rubber layer and inner liner.

A distance h from the bead base portion, which is defined by a point of intersection between an extension drawn from a bead heel and an extension drawn from the outer contour of the bead 2, to the center of the zone 12 must be lie within a range between 50% and 75%, preferably 50% and 70% of the distance H from the above mentioned bead base portion to the tread top point in the same direction as the distance h, that is, the tire sectional height. That zone 12 which is designated by the distance h corresponds to the shoulder 8 in the case of tires for two wheeled vehicles and which is considerably displaced toward the bead portion 2 if compared with the shoulder position of the tires for four wheeled vehicles. This is because of the fact that the four wheeled vehicle is provided at the ends of its wheel shaft with a pair of wheels. Such mechanism prevents the camber angle from becoming large during running. As a result, the outer contour of the tread in the tire section when the tire is mounted on the vehicles becomes flat in shape and substantially parallel with the road surface. The tread width occupies a width on the order of 80% of the maximum width of the tire. The tread is superimposed about the carcass which is toroidal in shape, so that the tread thickness is increased from the tread center toward the ends thereof and that the shoulder corresponding to the tread end portion is located at a position displaced toward the tread top in the range of the tire section height.

On the contrary, the tire for two wheeled vehicles is often used under such condition that the camber angle often becomes 30° and more.

As a result, even when the wheel is largely inclined to the road with the camber angle given to the above mentioned large angle, the tread width is made widened up to the tire maximum width for the purpose of preventing the ground contact area from decreasing. In addition, the tread outer congifuration is formed along the curved surface of the carcass so as to prevent the steering performance from abnormally changing even when the camber angle becomes gradually increased within the above mentioned range. As a result, the tread thickness is substantially uniformly distributed for overall zone of the tread.

The tire for two wheeled vehicles, therefore, becomes peculiarly unique in shape in which the shoulder 8 is remarkably displaced toward the bead portions 2.

Since the zone 12 is located at that position which substantially corresponds to the above described portion, hinge effect caused by the flexibility of the zone 12 functions to cause the driver to notice the abnormal state of the tire when it is punctured. At the same time, the reinforcement on the order of supporting the load subjected to the tire by inherent rigidity of the sidewall is difficult to be influenced on the tread portion. On the one hand, the tread is reinforced independently of the sidewall, so that even if the internal pressure applied to the tire is abnormally reduced, it is possible to prevent the tread from locally raising from the ground contact surface.

In order to ascertain the ability of the tire when it is punctured, the following experimental tests have effected on both the safety tire constructed as above described according to the invention and the conventional safety tire in which the zone from the sidewall to the tread, particularly the shoulder portion is so reinforced that the shoulder portion is made integral with the sidewall and that the shoulder portion is the highest in rigidity.

The tire to be tested has a size of 4.50 H/7 A and includes a carcass comprising 4 plies formed of rubberized rayon cord layers having a cord angle inclined at 30° to the equatorial plane of tire and crossed each other. Between the second carcass ply 3-2 and the third carcass ply 3-3 is interposed a rubber layer 9 which is meniscus-shaped in section and extends from a position adjacent to the wire bead to the shoulder for the purpose of reinforcing the sidewall. The rubber layer 9 has a modulus of elasticity at 100% elongation of 50 kg/cm$^2$ and a maximum thickness of 4% of the maximum width of the tire when it is united with a rim of 2.50×17 and inflated by an internal pressure of 2.2 kg/cm$^2$.

The main region of the bead portion was reinforced by arranging therein 2 rayon cord reinforcing layers and 2 rubber sheets each having a thickness of 0.5 mm. The cord reinforcing layers are superimposed about the carcass such that the cord reinforcing layers cross the adjacent carcass ply cords at an angle of 40° with respect to the equatorial plane of the tire. One of the rubber sheets was interposed between the first carcass ply 3-1 and the second carcass ply 3-2, while the other rubber sheet was interposed between the third carcass ply 3-3 and the fourth carcass ply 3-4. The rubber sheets thus interposed between the carcass plies had a modulus of elasticity at 100% elongation of 50 kg/cm$^2$. The coating rubber covering the carcass ply had a modulus of elasticity at 100% elongation of 20 kg/cm$^2$.

Both the two reinforcing layers for reinforcing the sidewall and the tread, respectively, opposed each other at a portion (the zone 12 in the drawing) which is composed of the carcass and one cord layer superimposed about the outside of the carcass. This portion has a width of 10 mm and forms a zone which is not substantially reinforced and tends to be easily bent and which provides a reduced thickness portion having a thickness of 70% of the thickness of the carcass inclusive of the tread cord reinforcing layers. The center position of the reduced thickness portion was located at a position which is 65% of the tire sectional height H from the bead base portion (h/H×100=65).

The conventional tire was reinforced by a rubber layer which is also meniscus-shaped in section and which has the same maximum thickness as the maximum thickness of the rubber layer arranged in the sidewall according to the invention. The rubber layer of the conventional tire extended between the carcass plies from the position adjacent to the bead wire through the tread end to a position which is located at the center between the tread end and the equatorial plane, the maximum thickness position of the rubber layer being located at a position near the upper end of the sidewall.

Both the tire according to the invention and the conventional tire were united with a rim of 2.50×17. Experimental tests were effected on both the tires so as to determine the amount of deflection of the tire when no inflation pressure is applied thereto, durability of the tire and handle maneuverability. The test results are shown in the following Table.

|  | Tire A | Tire B |
| --- | --- | --- |
| Deflection (Load:200 kg) | 120 | 100 |
| Durability (Load:304 kg) Speed:80 kg/hr) | 200 km complete running | 200 km complete running |
| Handle maneuverability | Easy | Difficult |

In the above Table, the tire A is the tire according to the invention and the tire B is the conventional tire. The numerical values showing the deflection of the tire A are rates based on a numerical value of 100 for the tire B.

As seen from the above test result, the deflection of the tire A is larger than that of the tire B. This means that the driver can easily note by his bodily sensation the puncture of tire occurred on its running.

The durability was measured under such condition that both the tires are mounted on the rear wheel of a two wheeled vehicle and run on a circuit course at a speed of 80 kg/h. Both the tires have completed its running over a distance of 200 km without inducing any failure such as a separation failure etc. Both the tires have ability of running over a distance which is required to be run after the tire is punctured when it runs on the road in practice.

The handle maneuverability of the tire A was tested prior to the durability test. In the case of effecting cornering which occurs in the usual running on the road, it was possible to easily operate the handle, as shown by "easy" in the Table without involving any tendency of excessive oversteering. On the contrary, the tire B becomes suddenly sidewardly deformed and hence the rear wheel slips from the time of inclining the vehicle to make the camber angle large, thereby swinging the rear wheel in a direction opposite to the cornering direction. As a result, it was necessary to turn the handle in a reverse direction. This reverse handling operation can only be effected by a skillful driver, thereby making dangerous the handling operation.

As stated hereinbefore, the tire according to the invention provides the important advantage that it is possible to notify the dirver by his bodily sensation that the tire is punctured and that the tire has such maneuverability which could never be attained by the conventional tire and has such abilities which are not inferior to those of the conventional tire when the tire is running on the road under its normal state.

What is claimed is:

1. A safety pneumatic tire for motorcyles compising a toroidal shaped carcass having rubberized cord plies extending between a pair of left and right beads and said cords of the plies being inclined with respect to the equatorial plane of the tire and being crossed with each other between said plies, a tread having a large width on a crown portion of said carcass and extending parallel to a curvature of said carcass, sidewalls connecting said tread to each of said beads with substantially uniform thickness, a sidewall reinforcing layer comprising a rubber which is partially meniscus-shaped in section and disposed along said carcass in each sidewall, said sidewall reinforcing layer having a thickness required for supporting the load which is subjected to the tire when it is punctured and a modulus of elasticity at 100% elongation of 40 to 120/kg/cm$^2$ and made integral with said bead, a tread reinforcement comprising at least one rubber layer having a modulus of elasticity which is greater than a modulus of elasticity of ply coating rubber of the carcass and interposed between plies of the carcass, and a first and a second cord layer in which cords are inclined with respect to the equatorial plane of the tire at an angle which is greater than an angle formed by cords of the carcass plies with respect to the equatorial plane of the tire, said first cord layer being disposed on the underside of the carcass and said second cord layer is disposed on the overside of the carcass; and a relatively narrow zone formed on the carcass between said sidewall reinforcing layer and said rubber layer and which is easily susceptible to bending deformation, said narrow zone being located at a position which is a height (h) of 50% to 75% of a section height (H) of the tire, wherein the height (h) is a distance from a bead base to the center of the narrow zone in the radial direction of the tire and the section height (H) is a distance from the bead base to a top of the tread in said direction.

2. The tire according to claim 1, wherein said narrow zone comprises a reduced thickness portion having a thickness which is thinner than a thickness of said carcass inclusive of said rubber layer.

3. The tire according to claim 1, wherein said sidewall reinforcing layer is interposed between said cord plies of the carcass.

4. The tire according to claim 1, wherein said sidewall reinforcing layer further includes at least one cord layer.

5. The tire according to claim 1, wherein said sheet-shaped rubber layer has a modulus of elasticity of 100% elongation of 40 to 120 kg/cm$^2$.

6. The tire according to claim 1, wherein the cords of said cord layers are disposed in different directions to the cords of the carcass ply adjacent thereto.

7. The tire according to claim 1, wherein said first cord layer has a cord angle which is greater than the cord angle of said second cord layer.

* * * * *